US008226310B2

(12) United States Patent
Grant et al.

(10) Patent No.: US 8,226,310 B2
(45) Date of Patent: Jul. 24, 2012

(54) APPARATUS INCLUDING A PLURALITY OF KEYS HAVING IN-USE AND STOWED CONFIGURATIONS

(75) Inventors: Silas Joe Grant, London (GB); Chee Yee Wong, London (GB); Daniel Wilkinson Gratiot, London (GB); Tom Eaton, Gloucestershire (GB)

(73) Assignee: Nokia Corporation, Espoo (FI)

( * ) Notice: Subject to any disclaimer, the term of this patent is extended or adjusted under 35 U.S.C. 154(b) by 546 days.

(21) Appl. No.: 12/381,402

(22) Filed: Mar. 10, 2009

(65) Prior Publication Data

US 2010/0232860 A1 Sep. 16, 2010

(51) Int. Cl.
*G06F 3/02* (2006.01)
*G06F 3/023* (2006.01)

(52) U.S. Cl. ........ 400/682; 400/490; 400/488; 400/472; 361/679.13

(58) Field of Classification Search .................. 400/472, 400/480, 481, 488, 489, 713, 714; 361/679.13
See application file for complete search history.

(56) References Cited

U.S. PATENT DOCUMENTS

| | | | | |
|---|---|---|---|---|
| 5,532,904 | A * | 7/1996 | Sellers | 361/679.13 |
| 5,635,928 | A * | 6/1997 | Takagi et al. | 341/22 |
| 5,734,136 | A * | 3/1998 | Newcomer et al. | 200/5 A |
| 5,790,370 | A * | 8/1998 | Merkel | 361/679.13 |
| 5,793,311 | A * | 8/1998 | Wood | 341/22 |
| 5,933,320 | A * | 8/1999 | Malhi | 361/679.55 |
| 5,971,637 | A * | 10/1999 | Malhi et al. | 400/491.2 |
| 6,019,530 | A * | 2/2000 | Lanzetta et al. | 400/491.1 |
| 6,559,399 | B2 * | 5/2003 | Hsu et al. | 200/344 |
| 7,858,891 | B2 * | 12/2010 | Strohband et al. | 200/406 |
| 2002/0167787 | A1 | 11/2002 | Kitamura et al. | 361/625 |
| 2003/0193419 | A1 * | 10/2003 | Hsu | 341/22 |
| 2004/0061685 | A1 | 4/2004 | Ostergard et al. | 345/169 |
| 2004/0228076 | A1 * | 11/2004 | Clapper | 361/681 |

FOREIGN PATENT DOCUMENTS

EP 235733 A1 * 9/1987

* cited by examiner

*Primary Examiner* — Leslie J Evanisko
(74) *Attorney, Agent, or Firm* — Harrington & Smith

(57) ABSTRACT

An apparatus including: a plurality of keys each having an in-use configuration and a stowed configuration, wherein a key when in the in-use configuration is configured to travel between a first relatively raised position and a second relatively lowered position under a user applied force and is configured to return to the first relatively raised position after removal of the user applied force and wherein a key when in the stowed configuration is unable to travel to the first relatively raised position.

15 Claims, 3 Drawing Sheets

APPARATUS INCLUDING A PLURALITY OF KEYS HAVING IN-USE AND STOWED CONFIGURATIONS

FIELD OF THE INVENTION

Embodiments of the present invention relate to keys for an apparatus. In particular, they relate to keys suitable where compactness is important.

BACKGROUND

Keys that travel to actuate an underlying switch when pressed by a user typically provide for accurate user input and good tactile feedback to the user. In contrast, keys that do not travel such as keys on touch sensitive displays typically provide for less accurate user input and less tactile feedback to the user.

However, providing the space through which a key travels increases the volume of the keypad and the apparatus housing the keypad. This may be a disadvantage, particularly if the apparatus is a hand held apparatus where maintaining a small size is important.

BRIEF DESCRIPTION

According to various, but not necessarily all, embodiments of the invention there is provided an apparatus comprising: a plurality of keys each having an in-use configuration and a stowed configuration, wherein a key when in the in-use configuration is configured to travel between a first relatively raised position and a second relatively lowered position under a user applied force and is configured to return to the first relatively raised position after removal of the user applied force and wherein a key when in the stowed configuration is unable to travel to the first relatively raised position.

The in-use configuration provides space through which a key travels and the stowed configuration maintains a small size for the apparatus. The apparatus therefore has the advantage of being compact when not in use (stowed configuration) and the advantage of having keys that travel when in use (in-use configuration).

The keys in the first relatively raised position of the in-use configuration may have a raised profile and the keys in the stowed configuration may have a lowered profile.

The keys when in the stowed configuration may not be operable for user input to the apparatus.

The apparatus may further comprise a mechanism configured to retain at least one key in the stowed configuration. The mechanism may be configured to simultaneously change the configuration of each of the plurality of keys from the in-use configuration to the stowed configuration. The mechanism may comprise a cover such as, for example, a sliding cover.

The apparatus may further comprise bias configured to urge the keys towards the in-use configuration and away from the stowed configuration.

The apparatus may further comprise bias configured to urge the keys towards the relatively raised position of the in-use configuration.

According to one embodiment, the keys may comprise resilient material having an inherent bias urging travel towards the first relatively raised position of the in-use configuration. A key may comprise a single unitary member of resilient material. The resilient material comprises shape metal alloy that is deformed in the stowed configuration.

According to one embodiment, the keys may comprise: a first member and a second member interconnected via an intermediary joint that enables relative rotational movement of the first and second members. The first member may comprise a first end opposing a second end, the first end being interconnected to the intermediary joint and the second end being interconnected to the apparatus via an end joint that enables relative rotational movement of the first member relative to the apparatus.

The second member may comprise a third end opposing a fourth end, the third end being interconnected to the intermediary joint and the fourth end being interconnected to a track of the apparatus via a slider for translational sliding movement relative to the apparatus. A smallest one of the angles formed between the first member and the second member at the intermediary joint, may be smaller for the in-use configuration than the stowed configuration. A mechanism may bias the first and second members towards the in-use configuration. A latch may maintain the first and second members in the stowed configuration.

According to another embodiment, the plurality of keys may be part of a keypad that has an expanded in-use configuration and a contracted stowed configuration wherein the plurality of keys are configured to move in unison from the keys' in-use configurations, corresponding to the keypad's in-use configuration, to the keys' stowed configuration corresponding to the keypad's stowed configuration.

According to various, but not necessarily all, embodiments of the invention there is provided an apparatus comprising: a plurality of keys each having an in-use configuration and a stowed configuration; means for enabling travel of the keys, when in the in-use configuration, between first relatively raised positions and second relatively lowered positions under respective user applied forces; and means for enabling automatic return of the keys, when in the in-use configuration, to the first relatively raised positions after removal of the respective user applied forces; and means for disabling user activated travel of the keys, when in the stowed configuration, between the first relatively raised positions and the second relatively lowered positions According to various, but not necessarily all, embodiments of the invention there is provided a keypad module for an apparatus comprising: a plurality of keys each having an in-use configuration and a stowed configuration, wherein a key when in the in-use configuration is configured to travel between a first relatively raised position and a second relatively lowered position under an applied force and is configured to return to the first relatively raised position after removal of the applied force, and wherein a key when in the stowed configuration does not travel to the first relatively raised position.

BRIEF DESCRIPTION OF THE DRAWINGS

For a better understanding of various examples of embodiments of the present invention reference will now be made by way of example only to the accompanying drawings in which.

DETAILED DESCRIPTION

Figure 1A:
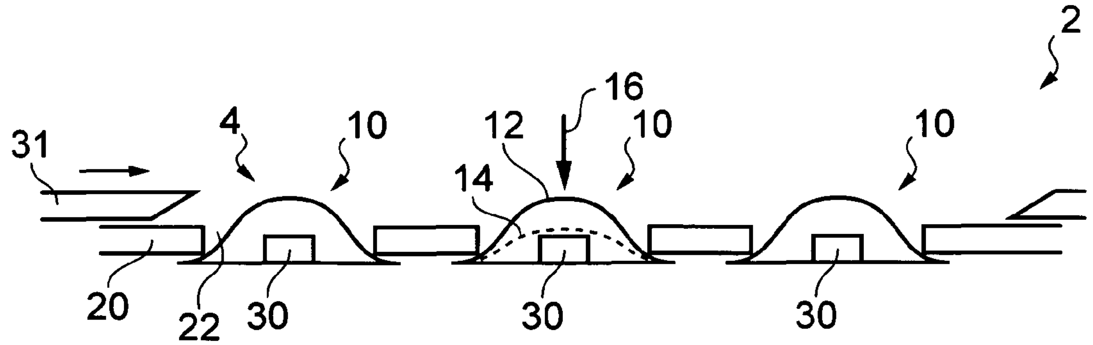
FIGS. 1A and 1B schematically illustrate a first embodiment of an apparatus comprising keys in respectively an in-use configuration and a stowed configuration.

The Figs schematically illustrate an apparatus 2 comprising: a plurality of keys 10 each of which has an in-use configuration 4 and a stowed configuration 6. A key 10 when it is in the in-use configuration 4 is configured to travel between a first relatively raised position 12 and a second relatively lower position 14 under a user applied force 16 and is configured to return to the first relatively raised position 12 after removal of the user applied force 16. A key when in the stowed configuration 6 is unable to travel to the first relatively raised position 12.

The apparatus 2 may be a hand portable electronic apparatus such as a mobile cellular telephone, a personal music player, a personal digital assistant etc.

The apparatus 2 may alternatively be a keypad module that exists as an independent commercial product that is combined with the switches 30 during manufacture of an electronic apparatus. As used here 'module' refers to a unit or apparatus that excludes certain parts/components that would be added by an end manufacturer or a user.

First Embodiment

Figure 1B:
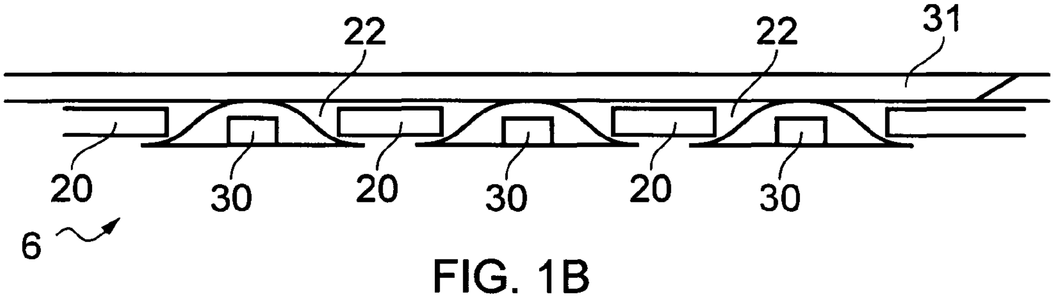

A first embodiment of the apparatus 2 is schematically illustrated in FIGS. 1A and 1B. In this embodiment, a sliding cover 31 is used to cover (FIG. 1B) and uncover (FIG. 1A) a keypad housing 20. When the keypad housing 20 is covered (FIG. 1B), the keys 10 are in the stowed configuration. When the keypad housing 20 is slid back to expose the keypad housing 20 (FIG. 1A), the keys 10 are in the in-use configuration.

Each key 10 when it is in the in-use configuration 4 is configured to travel from the first relatively raised position 12 to the second relatively lower position 14 under a user applied force 16 and to return to the first relatively raised position 12 after removal of the user applied force 16. The key 10 when moved into the second relatively lower position 14 actuates a switch 30 which provides a user input electrical signal.

The keypad housing 20 has a plurality of apertures 22. The plurality of keys 10 protrude through the apertures 22 to enable a user to apply a force 16 and actuate an underlying switch 30.

The key 10 in the first relatively raised position 12 of the in-use configuration 4 has a raised profile such that the key protrudes above the keypad housing 20 and lies on the path of the slidable cover 31. This is the neutral equilibrium position.

As the slidable cover moves over the keypad housing 20 it abuts and deforms the keys 10 lowering their profile so that the cover 31 can pass over them. In one implementation, the deformation of the keys caused by the cover 31 is sufficient to push the keys 10 beneath an upper surface of the keypad housing 20 but insufficient to actuate the underlying switches 30. In another embodiment, movement of the cover 31 is detected and the switches 30 are deactivated so that even if the deformation of the keys caused by the cover 31 is sufficient to physically actuate the underlying switches 30, the switches do not provide user input electrical signals.

When the key 10 is in the stowed configuration 6 it is unable to travel to the first relatively raised position 12 because of the intervening slidable cover 31 and is not operable for user input to the apparatus 2

The slidable cover 31 retains the keys 10 in the stowed configuration 6

The key 10 is biased towards the in-use configuration 4 and away from the stowed configuration 6 and towards the first relatively raised position of the in-use configuration so that the keys 10 pop-up into a raised profile when the slidable cover 31 is retracted.

The user pushes against this bias by applying the force 16 to move a key 10 between a first relatively raised position 12 and a second relatively lower position 14.

The cover 31 pushes against this bias to change the key 10 from the in-use configuration 4 to the stowed configuration 6.

In this embodiment, the keys 10 may be formed from unitary elements such as domes or as arcuate strips. A dome is a surface that has convex curvature along two mutually orthogonal axes. The curvature along each axes may be the same giving the dome rotational symmetry.

An arcuate strip is a surface that has convex curvature along one axes but is discontinuous along the other orthogonal axes. A strip may represent a section of a dome formed by making two parallel cuts through the dome.

The edges of the domes or arcuate strips act as supports for the convex curved surface. In one embodiment, the edges are not secured to an underlying substrate and when the user applies the force 16 the edges splay or move apart allowing the convex curved surface to be lowered towards the switch 30. In another embodiment, the edges may or may not be secured to an underlying substrate and when the user applies the force 16 the convex surface bends or deforms to actuate the underlying switch 30. A portion of the convex surface may, for example, become substantially concave. When the force 16 is removed the key 10 returns to its natural equilibrium shape, the convex curved surface.

The key 10 comprises resilient material that gives the key 10 an inherent bias and defines a natural equilibrium position at the first relatively raised position of the in-use configuration 4. The key 10 may for example be formed from shape metal alloy (memory metal) that is bent in the stowed configuration 6.

The shape metal alloy (memory metal) is chosen to have a phase transition temperature below normal ambient temperature. The metal alloy is then normally in a high temperature (austenitic) phase in which it can be deformed by an applied force from its equilibrium shape but instantly reverts back to the equilibrium shape when the force is removed. This allows the metal to be bent and twisted before reforming its shape when released.

Figure 2:
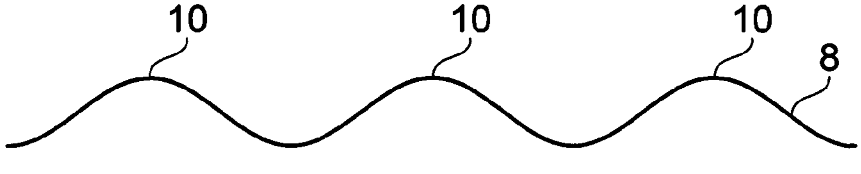
FIG. 2 schematically illustrates a single continuous element that forms a plurality of keys.

In FIGS. 1A and 1B the keys 10 are distinct unitary elements each of which presents a convex surface for actuation by a user. FIG. 2 schematically illustrates an alternative embodiment in which a single continuous element 8 forms a plurality of keys 10. The single continuous element has multiple portions with convex surfaces each of which forms a key 10.

Embodiment 2

Figure 3A:
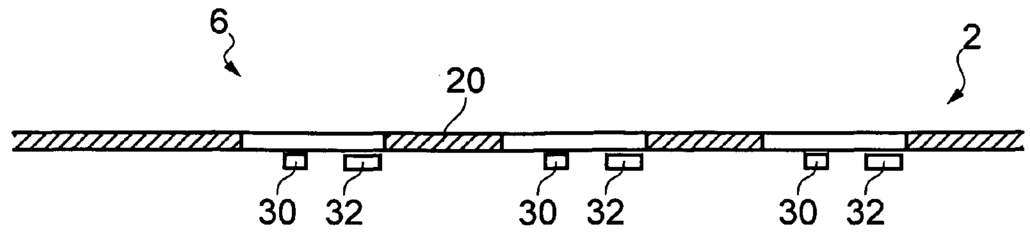
FIG. 3A schematically illustrates a second embodiment of an apparatus comprising keys in a stowed configuration.
Figure 3B:
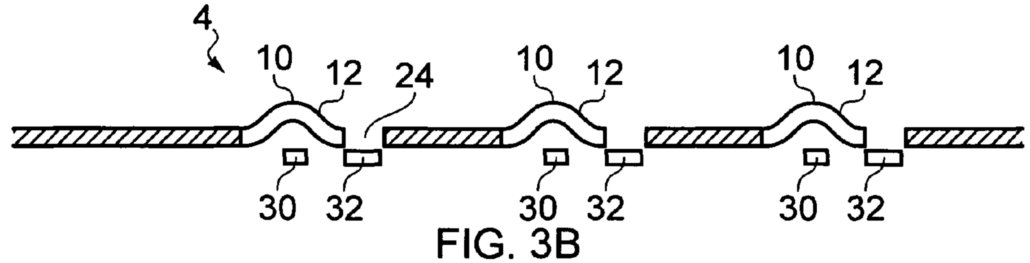
FIGS. 3B and 3C schematically illustrate a second embodiment of an apparatus comprising keys in respectively a raised position of the in-use configuration and a lower position of the in-use configuration.
Figure 3C:
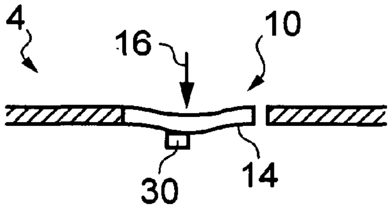

A second embodiment of the apparatus 2 is schematically illustrated in FIGS. 3A, 3B and 3C. The keys 10 are in the stowed configuration 6 in FIG. 3A and in the in-use configuration 4 in FIGS. 3B and 3C.

Each key 10 when it is in the in-use configuration 4 is configured to travel from the first relatively raised position 12 (FIG. 3B) to the second relatively lower position 14 (FIG. 3C) under a user applied force 16 and to return to the first relatively raised position 12 (FIG. 3B) after removal of the user applied force 16. The key 10 when moved into the second relatively lower position 14 actuates a switch 30 which provides a user input electrical signal.

The key 10 in the first relatively raised position 12 of the in-use configuration 4 has a raised profile such that the key 10 protrudes through apertures 22 in a keypad housing 20. This is the neutral equilibrium position.

When the key 10 is in the stowed configuration 6 it is unable to travel to the first relatively raised position 12 because it is held in the stowed position by a latch 32. The key 10 is not operable for user input to the apparatus 2

The key 10 is biased towards the in-use configuration 4 and away from the stowed configuration 6 and towards the first relatively raised position 12 of the in-use configuration 6 so that the keys 10 pop-up into a raised profile when the latch 32 is released.

The user pushes against this bias by applying the force 16 to move a key 10 between a first relatively raised position 12 and a second relatively lower position 14 to actuate the switch 30.

The user or a cover may also push against this bias to change the key 10 from the in-use configuration 4 to the stowed configuration 6. It may be necessary to enable the latches 32 so that they hold the key in the stowed configuration 6.

In this embodiment, the keys 10 may be formed from arcuate strips as described with reference to the first embodiment. One edge of an arcuate strip is fixed whereas the other is movable. The movable edge is held by the latch 32.

The key 10 comprises resilient material that gives the key 10 an inherent bias and defines a natural equilibrium position at the first relatively raised position of the in-use configuration 4. The key 10 may for example be formed from shape metal alloy (memory metal).

The shape metal alloy (memory metal) is chosen to have a phase transition temperature below normal ambient temperature. The metal alloy is then normally in the high temperature (austenitic) phase in which it can be deformed by an applied force from its equilibrium shape but instantly reverts back to the equilibrium shape when the force is removed. This allows the metal to be bent and twisted before reforming its shape when released.

In the stowed configuration 6, the key 10 has a low profile and extends across the whole of the aperture 22. The flat upper surface of the key 10 and the flat upper surface of the keypad housing 20 form a continuous surface.

In the in-use configuration 4, the key 10 has a raised convex profile but extends only partially across the aperture 22 leaving a gap 24 which may expose, for example, an underlying sign indicating the function of the key.

Embodiment 3

Figure 4A:
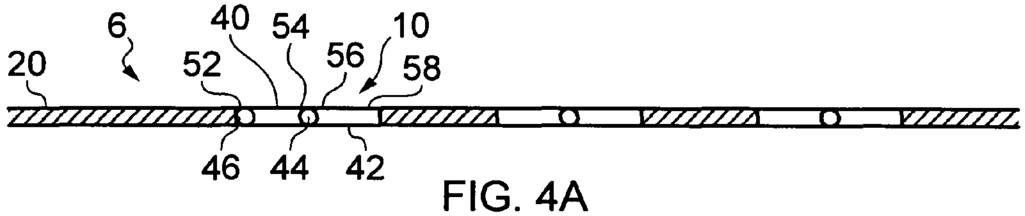
FIG. 4A schematically illustrates a third embodiment of an apparatus comprising keys in a stowed configuration.
Figure 4B:
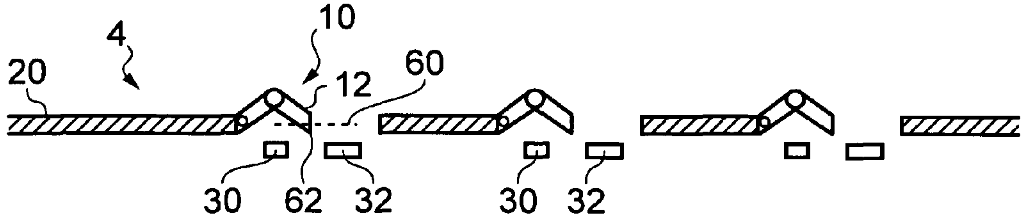
FIGS. 4B and 4C schematically illustrate a third embodiment of an apparatus comprising keys in respectively a raised position of the in-use configuration and a lower position of the in-use configuration.
Figure 4C:
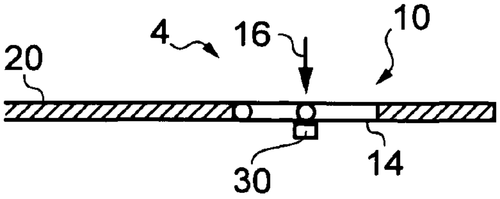

A third embodiment of the apparatus 2 is schematically illustrated in FIGS. 4A, 4B and 4C. The keys 10 are in the stowed configuration in FIG. 4A and in the in-use configuration 6 in FIGS. 4B and 4C.

Each key 10 when it is in the in-use configuration 4 is configured to travel from the first relatively raised position 12 (FIG. 4B) to the second relatively lower position 14 (FIG. 4C) under a user applied force 16 and to return to the first relatively raised position 12 (FIG. 4B) after removal of the user applied force 16. The key 10 when moved into the second relatively lower position 14 actuates a switch 30 which provides a user input electrical signal.

The key 10 in the first relatively raised position 12 of the in-use configuration 4 has a raised profile such that the key 10 protrudes through apertures 22 in a keypad housing 20. This is the neutral equilibrium position.

When the key 10 is in the stowed configuration 6 it is unable to travel to the first relatively raised position 12 because it is held in the stowed position by a latch 32. The key 10 is not operable for user input to the apparatus 2

The key 10 is biased towards the in-use configuration 4 and away from the stowed configuration 6 and towards the first relatively raised position 12 of the in-use configuration 6 so that the keys 10 pop-up into a raised profile when the latch 32 is released.

The user pushes against this bias by applying the force 16 to move a key 10 between a first relatively raised position 12 and a second relatively lower position 14 to actuate the switch 30.

The user or a cover may also push against this bias to change the key 10 from the in-use configuration 4 to the stowed configuration 6. It may be necessary to enable the latches 32 so that they hold the key in the stowed configuration 6.

In this embodiment, the keys 10 may be formed from a first member 40 and a second member 42 interconnected via an intermediary joint 44 such as a hinge. The intermediary joint enables relative rotational movement of the first and second members 40, 42.

The first member 40 comprises a first end 54 opposing a second end 52. The first end 54 is interconnected to the intermediary joint 44 and the second end 52 is interconnected to the keypad housing 20 of the apparatus 2 (20) via an end joint 46. The end joint enables relative rotational movement of the first member 40 relative to the keypad housing 20 of the apparatus 2

The second member 42 comprises a third end 56 opposing a fourth end 58. The third end 56 is interconnected to the intermediary joint 44 and the fourth end 58 is interconnected to a slider 62 that moves in a track 60 in the keypad housing 20. The track 20 retains the slider 62 and constrains movement of the slider (and hence the fourth end 58 of the second member 42) to translational sliding movement parallel to a front face of the keypad housing 20. The track and slider constrains the movement of the key 10.

In the first relatively raised position 12, the first member 40 and the send member 42 meet at an angle at the intermediate joint 44 forming a raised apex at the intermediate joint 44. In the illustrated example, the first member 40 and the second member 42 are approximately the same length. In other implementations all or some of the first members 40 may be longer (or shorter) than all or some of the second members 42.

In the second relatively lower position 14, the minimum angle between the first member 40 and the send member 42 at the intermediate joint 44 increases so that raised apex at the intermediate joint has a lower profile, vanishes or is inverted.

In the in-use configuration 4, the key 10 has a raised profile but extends only partially across the aperture 22 leaving a gap 24 which may expose, for example, an underlying sign indicating the function of the key.

In the stowed configuration, the minimum angle between the first member 40 and the send member 42 at the intermediate joint 44 is approximately 180 degrees.

The key 10 consequentially has a low profile and extends across the whole of the aperture 22. The flat upper surface of the key 10 and the flat upper surface of the keypad housing 20 form a continuous surface.

The mechanism that biases the key 10 towards the in-use configuration 4 and away from the stowed configuration 6 and towards the first relatively raised position 12 of the in-use configuration 6 so that the keys 10 pop-up into a raised profile when the latch 32 is released may comprise a mechanism for urging the second end 52 of the first member 40 and the fourth end 58 of the second member 42 towards each other. A suitable mechanism may, for example, comprise a stretched portion of elastic material between each end portion 52, 58. Another suitable mechanism may be a compressed spring at the fourth end 58 of the second member 42.

Embodiment 4

Figure 5A:
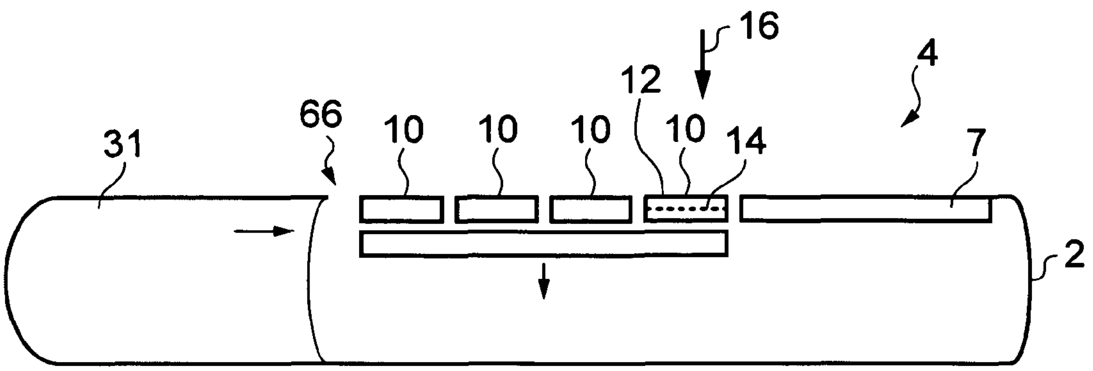
FIG. 5A schematically illustrates a fourth embodiment of an apparatus comprising a keypad in an in-use configuration.
Figure 5B:
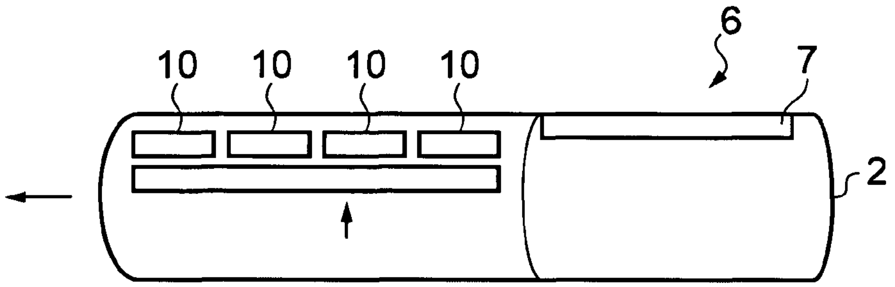
FIG. 5B schematically illustrates the fourth embodiment of the apparatus comprising a keypad in a stowed configuration.

A fourth embodiment of the apparatus 2 is schematically illustrated in FIGS. 5A and 5B. The keys 10 are in the stowed configuration 6 in FIG. 5B and in the in-use configuration 4 in FIG. 5A.

Each key 10 when it is in the in-use configuration 4 is configured to travel from the first relatively raised position 12 (FIG. 5A) to the second relatively lower position 14 (FIG. 5B) under a user applied force 16 and to return to the first relatively raised position 12 (FIG. 5A) after removal of the user applied force 16. The key 10 when moved into the second relatively lower position 14 actuates a switch 30 which provides a user input electrical signal.

The key 10 in the first relatively raised position 12 of the in-use configuration 4 has a raised profile such that the key 10 is substantially flush with a front face of a display 7 of the apparatus 2.

When the key 10 is in the stowed configuration 6 the keys 10 are positioned below the level of the front face of the display 7 and are covered by a cover 31 that has an exterior surface that is flush with the front face of the display 7. The keys 10 are not operable for user input to the apparatus 2

The keys 10 are arranged as a keypad 66 that moves in unison upwards from the stowed configuration (FIG. 5B) into the in-use configuration (FIG. 5A) and moves downwards from the in-use configuration (FIG. 5A) into the stowed configuration (FIG. 5B)

The keypad 66 is biased towards the in-use configuration 4 and away from the stowed configuration 6 so that the keypad 66 pops-up into a raised profile when the cover 31 is slid back (FIG. 5A). Furthermore each key 10 of the keypad 66 is individually biased towards the first relatively raised position 12 of the in-use configuration 4.

Figure 6:
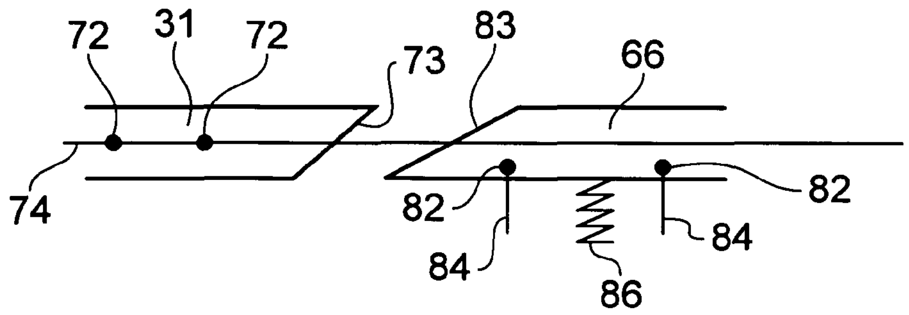
FIG. 6 schematically illustrates a mechanism configured to change the configuration of a keypad.

The cover when slid towards the closed position pushes against the keypad bias 86 to change the keypad 66 from the in-use configuration 4 to the stowed configuration 6. Referring to FIG. 6, there is illustrated an example of a mechanism for changing the configuration of the keypad 66. The cover 31 has a sloped leading edge 73. The cover 31 is attached by sliders 72 to a straight guide rail 74 along which the sliders slide. This constrains the movement of the cover 31 to translational movement in the direction of the guide rail 74. The keypad 66 has a cam surface 83 facing the leading edge 73 of the cover 31. The keypad 66 is attached by sliders 82 to a straight guide rails 84 along which the sliders slide. This constrains the movement of the cover 31 to translational movement in the direction of the guide rails 84 which are substantially orthogonal to the guide rail 74. A bias mechanism 86, which may for example be a spring, urges the keypad 66 towards the in-use configuration. As the cover 31 is moved towards the keypad 66, the leading edge 73 abuts the sloped cam surface 83 and forces the keypad to move downwards against the bias 86 into the stowed configuration. When the cover is later extended so that it no longer overlies the keypad 66, the bias 86 urges the keypad 66 from the stowed configuration towards the in-use configuration.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:

a plurality of keys each having an in-use configuration and a stowed configuration, and a keypad housing comprising key apertures, wherein the plurality of keys, are located at respective ones of the key apertures, wherein a first one of the keys, when in the in-use configuration, is at least partially located in a first respective key aperture and extends past a front side of the keypad housing, wherein the first key is configured to travel between a first relatively raised position and a second relatively lowered position under a user applied force and is configured to return to the first relatively raised position after removal of the user applied force, and wherein the first key, when in the stowed configuration, is recessed in the first respective key aperture substantially beneath the front side of the keypad housing and unable to travel to the first relatively raised position, and a mechanism configured to retain at least one key in the stowed configuration, wherein the mechanism comprises a sliding cover configured to slide above the front side of the keypad housing.

2. An apparatus as claimed in claim 1, wherein keys in the first relatively raised position of the in-use configuration have a raised profile and the keys in the stowed configuration have a lowered profile.

3. An apparatus as claimed in claim 1, wherein keys when in the stowed configuration are not operable for user input to the apparatus.

4. An apparatus as claimed in claim 1, wherein the mechanism configured to retain at least one key in the stowed configuration, is configured to simultaneously change the configuration of each of the plurality of keys from the in-use configuration to the stowed configuration.

5. An apparatus as claimed in claim 1, further comprising bias configured to urge the keys towards the in-use configuration and away from the stowed configuration.

6. An apparatus as claimed in claim 1, further comprising bias configured to urge the keys towards the relatively raised position of the in-use configuration.

7. An apparatus as claimed in claim 1, wherein the first key comprises a member made of resilient material having an inherent bias urging travel towards the first relatively raised position of the in-use configuration, where in the in-use configuration the member extends through the first respective key aperture and past a front side of the keypad housing.

8. An apparatus as claimed in claim 7, wherein the member of the first key is a single unitary member.

9. An apparatus as claimed in claim 7, wherein the resilient material comprises shape metal alloy that is deformed in the stowed configuration.

10. An apparatus as claimed in claim 1, wherein the plurality of keys are part of a keypad that has an expanded in-use configuration and a contracted stowed configuration wherein the plurality of keys are configured to move in unison between the expanded in-use configuration of the keypad and the contracted stowed configuration of the keypad.

11. An apparatus comprising:

a plurality of keys each having an in-use configuration and a stowed configuration, and a keypad housing comprising key apertures, wherein the plurality of keys are located at respective ones of the key apertures, wherein a first one of the keys, when in the in-use configuration, is at least partially located in a first respective key aperture and extends past a front side of the keypad housing, wherein the first key is configured to travel between a first relatively raised position and a second relatively lowered position under a user applied force and is configured to return to the first relatively raised position after removal of the user applied force, and wherein the first key, when in the stowed configuration, is recessed in the first respective key aperture substantially beneath the front side of the keypad housing and unable to travel to the first relatively raised position, and wherein the keys comprise: a first member and a second member interconnected via an intermediary joint that enables relative rotational movement of the first and second members.

12. An apparatus as claimed in claim 11, wherein the first member comprises a first end opposing a second end, the first end is interconnected to the intermediary joint and the second, end is interconnected to the apparatus via an end joint that enables relative rotational movement of the first member relative to the apparatus.

13. An apparatus as claimed in claim 12, wherein the second member comprises a third end opposing a fourth end, the third end is interconnected to the intermediary joint and the fourth end is interconnected to a track of the apparatus via a slider for translational sliding movement relative to the apparatus.

14. An apparatus as claimed in claim 11, wherein a smallest one of the angles formed between the first member and the second member at the intermediary joint, is smaller for the in-use configuration than the stowed configuration.

15. An apparatus as claimed in claim 11, wherein a mechanism biases the first and second members towards the in-use configuration and a latch maintains the first and second members in the stowed configuration.

* * * * *